(12) United States Patent
Ruppin et al.

(10) Patent No.: US 10,075,473 B2
(45) Date of Patent: *Sep. 11, 2018

(54) SYSTEM AND METHOD FOR SECURE SYNCHRONIZATION OF DATA ACROSS MULTIPLE COMPUTING DEVICES

(71) Applicant: BLACKBERRY LIMITED, Waterloo (CA)

(72) Inventors: Adi Ruppin, Los Altos, CA (US); Doron Peri, Tel Aviv (IL); Yigal Ben-Natan, Petach-tikva (IL); Gil S. Shidlansik, Tel Aviv-Jaffa (IL); Miron Liram, Kfar Saba (IL); Ori Saporta, Givatayim (IL); David Potashinsky, Holon (IL); Uri Yulevich, Beit Halevi (IL); Timothy Choi, Palo Alto, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 135 days.

This patent is subject to a terminal disclaimer.

(21) Appl. No.: 14/620,645

(22) Filed: Feb. 12, 2015

(65) Prior Publication Data

US 2015/0180905 A1    Jun. 25, 2015

Related U.S. Application Data

(63) Continuation of application No. 13/585,534, filed on Aug. 14, 2012, now Pat. No. 8,984,582.

(51) Int. Cl.
*H04L 29/06* (2006.01)
*G06F 21/10* (2013.01)
(Continued)

(52) U.S. Cl.
CPC ........ *H04L 63/20* (2013.01); *G06F 17/30174* (2013.01); *G06F 21/10* (2013.01);
(Continued)

(58) Field of Classification Search
CPC ..... H04L 67/1095; H04L 63/08; H04L 67/10; H04L 63/10; H04L 63/20
See application file for complete search history.

(56) References Cited

U.S. PATENT DOCUMENTS 6,735,676 B1    5/2004  Kanda et al.
6,965,569 B1   11/2005  Carolan et al.
(Continued)

FOREIGN PATENT DOCUMENTS

WO     2001/0135211         5/2001
WO     WO 01/35211 A2 *     5/2001
WO     WO 0135211 A2        5/2001

OTHER PUBLICATIONS

Kinji Matsumura et al., Transforming Data Broadcast Contents to Fit Different User Interfaces, Sep. 19-22, 2005, ACM, pp. 323-324.*
(Continued)

*Primary Examiner* — Kari L Schmidt
*Assistant Examiner* — Fahimeh Mohammadi
(74) *Attorney, Agent, or Firm* — Donna Flores; Fleit Gibbons Gutman Bongini & Bianco P.L.

(57) ABSTRACT

A computer implemented method and apparatus comprises detecting a file content update on a first client computer system, the file to be synchronized on a plurality of different types of client computer systems in a plurality of formats. The method further comprises associating a security policy with the file, wherein the security policy includes restrictions to limit one or more actions that can be performed with the file, and synchronizing the file to a second client computing system while applying the security policy to provide
(Continued)

controls for enforcement of the restrictions at the second client computer system.

29 Claims, 8 Drawing Sheets

(51) Int. Cl.
  *G06F 21/12* (2013.01)
  *H04L 29/08* (2006.01)
  *G06F 17/30* (2006.01)

(52) U.S. Cl.
  CPC ............ *G06F 21/128* (2013.01); *H04L 63/10* (2013.01); *H04L 67/06* (2013.01); *H04L 67/10* (2013.01); *H04L 67/1095* (2013.01); *H04L 63/08* (2013.01)

(56) References Cited

U.S. PATENT DOCUMENTS

| | | | |
|---|---|---|---|
| 8,327,080 B1* | 12/2012 | Der | G06F 12/0804 711/141 |
| 2003/0065642 A1 | 4/2003 | Zee | |
| 2004/0158527 A1* | 8/2004 | Lambert | G06F 17/30864 705/51 |
| 2004/0193912 A1* | 9/2004 | Li | G06F 21/55 726/14 |
| 2004/0205621 A1 | 10/2004 | Johnson et al. | |
| 2005/0273592 A1* | 12/2005 | Pryor | H04L 9/32 713/150 |
| 2006/0041840 A1 | 2/2006 | Blair et al. | |
| 2006/0048224 A1* | 3/2006 | Duncan | G06F 21/10 726/22 |
| 2006/0101064 A1 | 5/2006 | Strong | |
| 2006/0168125 A1 | 7/2006 | Leo Spork | |
| 2006/0041603 A1 | 12/2006 | Paterson et al. | |
| 2008/0114693 A1* | 5/2008 | Jogand-Coulomb | G06F 21/10 705/59 |
| 2008/0244270 A1 | 10/2008 | Zimmels et al. | |
| 2009/0249185 A1* | 10/2009 | Datar | G06F 17/30817 715/230 |
| 2009/0282459 A1* | 11/2009 | Kitani | G03G 21/04 726/1 |
| 2010/0017882 A1* | 1/2010 | Chou | G06F 21/10 726/26 |
| 2010/0064341 A1* | 3/2010 | Aldera | H04L 63/102 726/1 |
| 2010/0122313 A1* | 5/2010 | Ivgi | G06F 21/6218 726/1 |
| 2011/0078332 A1 | 3/2011 | Poon | |
| 2011/0106880 A1 | 5/2011 | Strong et al. | |
| 2011/0154255 A1* | 6/2011 | Ryu | H04W 4/80 715/810 |
| 2011/0252071 A1 | 10/2011 | Cidon | |
| 2012/0079095 A1 | 3/2012 | Evans et al. | |
| 2012/0084834 A1 | 4/2012 | Brown et al. | |
| 2012/0096368 A1 | 4/2012 | McDowell | |
| 2012/0203862 A1* | 8/2012 | Tayeb | G06F 8/61 709/217 |
| 2012/0226823 A1 | 9/2012 | Livnat et al. | |
| 2013/0125209 A1 | 5/2013 | Schumacher | |
| 2013/0166391 A1 | 6/2013 | Blow | |
| 2013/0268999 A1 | 10/2013 | Kiang et al. | |
| 2014/0089319 A1* | 3/2014 | Lakshmanan | G06F 17/30206 707/748 |

OTHER PUBLICATIONS

Bruno Gil et al., Impacts of data interchange formats on energy consumption and performance in Smartphones, Jul. 11, 2011, ACM, pp. 1-6.*

Sachin Agarwal et al., On the Scalability of Data Synchronization Protocols for PDAs and Mobile Devices, Aug. 7, 2002, IEEE, pp. 22-28.*

Byung-Yun Lee et al., Data Synchronization Protocol in Mobile Computing Environment Using SyncML, Nov. 7, 2002, IEEE, pp. 133-137.*

PCT/US2013/053842, International Preliminary Report on Patentability, dated Feb. 26, 2015, 12 pages.

"Active Directory Rights Management Services Overview," <http://technet.microsoft.com/en-us/library/cc771627(v=ws.10).aspx>, Updated May 3, 2007, 4 pages.

"Oracle Information Rights Management 11 g—Managing Information Everywhere it is Stored and Used," <http://www.oracle.com/technetwork/middleware/webcenter/content/irm-technical-whitepaper-134345.pdf>, Mar. 2010, 23 pages.

"SyncML Sync Protocal, Version 1.1," SyncML, vol. 1.1, Feb. 15, 2002, 62 pages.

"WatchDox Closes Document Security Gaps for BlackBerry Users; Introduces Secure Sync Capabilities for iPad and iPhone," <http://www2.watchdox.com/2011/07/watchdox-closes-document-security-gaps-for-blackberry-users-introduces-secure-sync-capabilities-for-ipad-and-iphone>, Jul. 25, 2011.

Agarwal, Sachin, et al, "On the Scalability of Data Synchronization Protocols for PDAs and Mobile Devices," IEEE, vol. 16, Issue 4, Aug. 7, 2002, pp. 22-28.

Butrico, Maria, et al, "Enterprise Data Access from Mobile Computers: An End-to-End Story," IEEE, Dated Feb. 28, 2000-Feb. 29, 2000, pp. 9-16.

PCT Application No. PCT/US2013/053842, Communication Relating to the Results of the Partial International Search, dated Nov. 12, 2013.

PCT/US2013/053842, International Search Report and the Written Opinion, dated Feb. 10, 2014, 18 pages.

Pierce, Benjamin C, et al, "What's in Unison? A Formal Specification and Reference Implementation of a File Synchronizer," <http://www.cis.upenn.edu/~bcpierce/papers/unisonspec.pdf>, Feb. 24, 2004, 33 pages.

Ren, Ligang, et al, "Data Synchronization in the Mobile Internet," IEEE, 2000, pp. 95-98.

Sherman, Aliza," WatchDox Makes Document Security Simple," <http://gigaom.com/2009/06/01/watchdox-makes-document-security-simple>, Jun. 1, 2009.

Tonosaki, Shuntaro, et al, "Efficiently Synchronizing Virtual Machines in Cloud Computing Environments," IEEE, Nov. 29, 2011-Dec. 1, 2011, pp. 154-162.

U.S. Appl. No. 13/474,089, Non-Final Office Action, dated May 8, 2014, 18 pages.

U.S. Appl. No. 13/474,089, Final Office Action, dated Jan. 23, 2015, 18 pages.

Non-Final Office Action dated Jul. 28, 2016, received for U.S. Appl. No. 14/620,638.

Office Action dated Dec. 29, 2016 received for U.S. Appl. No. 14/620,638.

Advisory Action dated Mar. 22, 2017, received for U.S. Appl. No. 14/620,638.

Office Action dated Jun. 22, 2017 received for U.S. Appl. No. 14/620,638.

Richard Han et al., WebSplitter: A Unified XML Framework for Multi-Device Collaborative Web Browsing, Dec. 2000, ACM, pp. 221-230. 2000.

Jiran Zhang et al., HadoopRsync, Dec. 12-14, 2011, IEEE, pp. 166-173. 2011.

Shuang Qiu et al., Versioned File Backup and Synchronization for Storage Clouds, May 13-16, 2013, IEEE, pp. 302-310. 2013.

Md Maruf Hasan, et al., A Metadata-orientated Integrated Approach to Personal File Management, Apr. 24-26, 2012, IEEE, pp. 459-464. 2012.

* cited by examiner

SYSTEM AND METHOD FOR SECURE SYNCHRONIZATION OF DATA ACROSS MULTIPLE COMPUTING DEVICES

RELATED APPLICATIONS

The present application is a continuation of U.S. application Ser. No. 13/585,534 filed on Aug. 14, 2012.

TECHNICAL FIELD

The present invention relates to the field of data synchronization; more particularly, the present invention relates to securely synchronizing data across multiple computing devices.

BACKGROUND

File synchronization solutions facilitate the sharing of files among a plurality of users and devices. But while file synchronization solutions offer a much desired productivity boost, they also present serious risks of data leakage, as massive amounts of enterprise data can be taken out of the enterprise network potentially and placed on non-secured public clouds or on individuals' personal computing devices. Additionally, file synchronization solutions typically lack centralized control and visibility. That is, the enterprise does not know what data is being shared or synchronized, with whom, and as a result such potential data loss may go undetected. For these reasons, file synchronization solutions are often discouraged or even blocked by security-conscious organizations.

While certain present file encryption solutions can be layered on top of existing file synchronization solutions, these merely encrypt documents prior to sharing them via the file synchronization systems, and are unable to control how documents are used or gain visibility to their whereabouts and use once they have been downloaded. Conversely, present information rights management solutions do not integrate with file synchronization solutions, they are generally ineffective when it comes to facilitating sharing of data beyond the enterprise perimeter, and are incapable of supporting the breadth of devices and platforms required in today's world.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The present invention describes a system and method for synchronizing data across a plurality of computing devices over a network. The data is controlled by utilizing encryption and information rights management techniques that are applied to data as it is transmitted and stored on some or all devices. The present invention, in one embodiment describes a system in which a security policy is associated with a file, resulting in permissions, or controls, for accessing, altering, and/or re-sharing the file being applied to the file. These controls may vary as the file is accessed by different users and/or on different computing devices. Furthermore, the file format is adapted to the device on which the data is being accessed. This provides end-to-end control of the data, while facilitating access to the file from a wide range of devices and applications.

Figure 1:
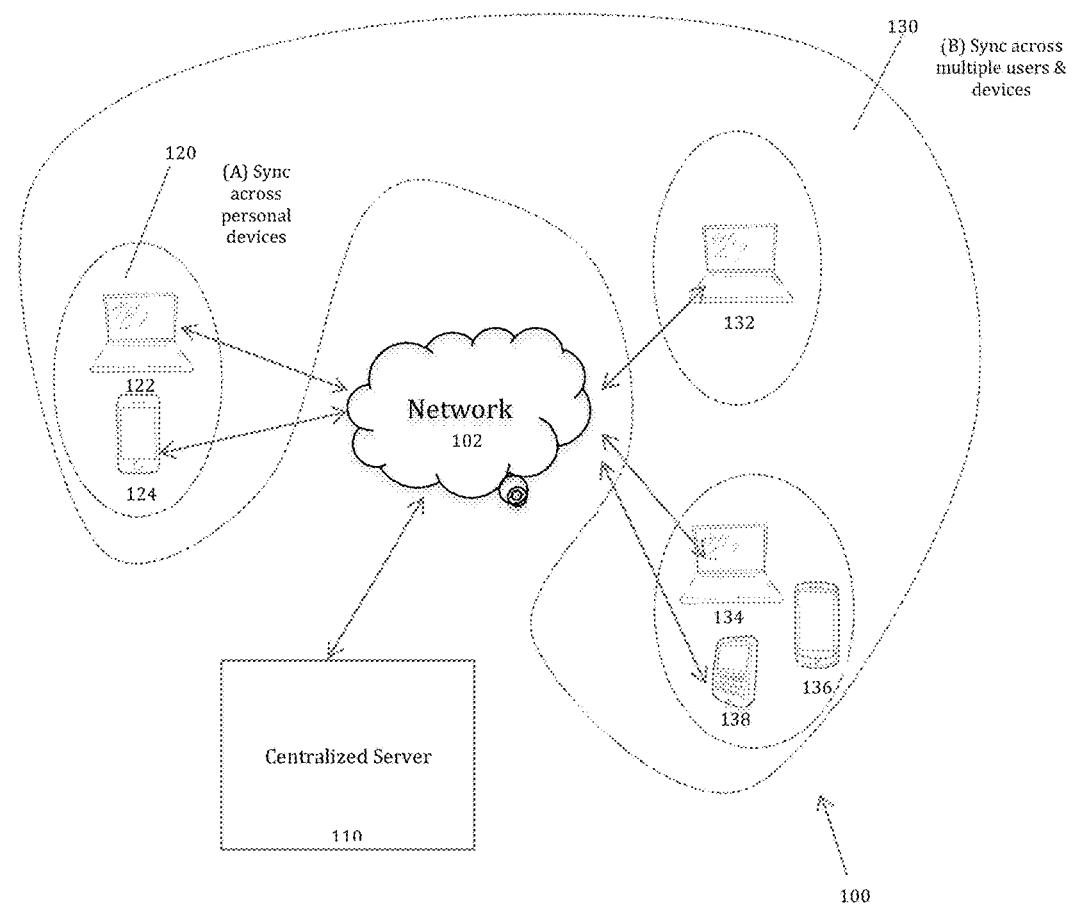
FIG. 1 is a network diagram of one embodiment of a secure file synchronization system.

FIG. 1 is a network diagram of one embodiment of a secure file synchronization system 100. In one embodiment, the secure file synchronization system 100 provides users who have multiple disparate computing devices, such as laptops, desktops, smartphones, tablets, etc. with a method that ensures that documents generated on one device are available and up-to-date on the other devices as well.

In one embodiment, the secure file synchronization system 100 includes a centralized server 110, one or more computing devices 120 associated with a single user (e.g., the (A) devices), as well as computing devices associated with other users 130. In one embodiment, the centralized server 110 is a server computer system, desktop computer system, or other computing device that provides secure file synchronization among the disparate computing devices, as discussed below.

The centralized server 110 and computing devices 120 and 130 may be coupled to a network 102 that communicates using any of the standard protocols for the secure exchange of information. In one embodiment, one or more computing devices may be coupled with the network via a wireless connection, such as a cellular telephone connection, wireless fidelity (Wi-Fi) connection, etc. The computing devices and centralized server may run on one Local Area Network (LAN) and may be incorporated into the same physical or logical system, or different physical or logical systems. Alternatively, the computing devices and centralized server may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In one embodiment, the centralized server 110, or computing devices 120 and 130, may further be connected to one or more computing devices, storage devices or applications maintaining a document repository (not shown) over a network connection or directly. These systems may include a network drive, network attached storage (NAS), storage area network (SAN), a content management system such as Microsoft SharePoint, or a cloud service, such as Salesforce.com™ or Google™ Docs™.

In some embodiments, data is securely synchronized from a synchronization application or module (not shown) run on a computing device to one or more associated synchronization applications or modules run on other computing devices. In some embodiments, a method of synchronizing data on the various devices, from the synchronization application to one or more associated synchronization applications, is performed by the first synchronization application communicating via centralized server 110 to the associated synchronization application(s) and may include generating a new version of a file, and propagating the new version of the file to the various computing devices 120 and 130, in response to an action performed on the file, such as creating a file or editing its contents. In one embodiment, a synchronization tool such as Unison is used. In some embodiments, each file may be associated with a unique identifier. In one embodiment, the unique identifier may be associated with all versions of the file.

In some embodiments, the method of synchronizing data from a synchronization application to one or more associated synchronization applications may further include the centralized server 110 identifying a change in meta-data, such as file deletion, rename, move, annotations, and changes to meta-data tags, or classifications. Moreover, a change of file security policy or permissions may be detected and appropriate controls may be distributed to associated synchronization applications. As an example, detecting a change by the administrator granting additional rights for a file, or removing certain rights from a file, may cause a change in a file's metadata, which is then synchronized by centralized server with files on other computing devices. In this way, an administrator may change security policy on a file that has already been distributed to recipients, and the change in security policy will be propagated to the copies held by those recipients.

In some embodiments, upon detection of a file content update by the centralized server 110, the file will be uploaded to the centralized server 110 using methods commonly used in industry. In one embodiment, such a file may be an unprotected file. In another embodiment, the file may be a file protected using encryption and/or certain controls. Controls may include information rights management techniques commonly used in industry (such as Microsoft RMS), which may involve the encryption of the file and the association of a policy to it that defines how it may be used, by whom, where, on what device and when. In one embodiment, uploading is performed over a secure connection, such as SSL (secure socket layer) or TLS (transport layer security).

In some embodiments, in order to initiate the synchronization process and to enforce controls on any user's computing device, user must be first authenticated on his or her computing device to the centralized server 110. In one embodiment, the authentication between a user on computing device, such as computing device 122, and the centralized server 110 is performed using industry standard methods. In one embodiment authentication is based on one or more of: establishing a user name and password, answering an email answerback, using a mobile callback, or performing a multi-factor authentication.

Once authenticated, in some embodiments, a token is associated with the user computing device 122, binding the user's identity to said device. In some embodiments, the token is used to establish a communication session between user computing device and the centralized server. The token can be set to expire according to a certain policy. For example, various policies may set the token so that it can never expire, it expires every session, it expires on demand, or it expires after a specified time (e.g. after 24 hours/5 downloads/etc.). In addition to the user and device authentication, in some embodiments, certain files' security policy may require an additional layer of user authentication before a file may be accessed. In one embodiment, a PIN code, password, or passcode may need to be entered in order to access those files. In accordance with some embodiments, authentication may further include verifying the server's identity based on its certificate prior to downloading or uploading data, as commonly done in industry.

In some embodiments, the method of synchronizing data from a synchronization application to one or more associated synchronization applications may further include comparing the new version of information at one of the computing systems against the information stored on a centralized server 110. If a new version is detected (i.e., file content or relevant metadata has been updated), the file will be uploaded to the centralized server 110. In one embodiment, certain metadata changes would not initialize synchronization, e.g. the "last opened" or "saved in location" metadata associated with the file may be disregarded when determining whether the file has been updated. In some embodiments, such an upload will be performed over a secure SSL or TLS connection, or other encrypted channels.

In some embodiments, the uploaded file may be encrypted by the centralized server 110 using a unique or substantially unique encryption key, and may be assigned certain controls determined by a security policy associated with the uploaded file. Controls may include but are not limited to restricting of viewing, copying, downloading, printing, and/or forwarding of the file, applying watermarks, setting expiration date and time, requiring an additional layer of authentication in order to access file, redacting certain portions of the file, preventing screen capture, and other controls.

In some embodiments, such controls will be determined according to a security policy taking into account on one or more of: the viewer's identity, role, geographic location, type of device, status of network connection, time of day, document source, file type, meta data, and content of the file. In some embodiments, default rights management policies may allow unrestricted use of a file by its trusted owner, and apply a stricter centrally-provisioned rights management policy to a file as it goes to a non-trusted party. For example, such a default policy may preclude other users who receive the file from forwarding or printing the file (e.g., users of computing devices 132-138 in FIG. 1), but allow its owner full access to it across all of his or her devices (e.g., user of computing devices 122 and 124 in FIG. 1). As another example of a default policy, full permissions may be granted for files on a user's main trusted device (122 in FIG. 1). However, the policy for the file as it is sent to the user's mobile devices (124 in FIG. 1) is more limiting.

In some embodiments, encryption keys assigned to files are randomly generated by centralized server 110 and utilize 256-bit AES or similar industry standard block cipher algorithms. File keys are stored securely on the centralized server. In some embodiments, the file keys may be encrypted with a master key that is separately stored on centralized server, may be applied in combination of such master key, or may be stored in a physically separate system such as a tamper-proof hardware security module (HSM).

In some embodiments, a central policy enforced by centralized server 110 may also determine the eligible recipients and devices to receive a file, based on the file's permissions, content, source, type, meta-data and the end user and device identity, type, time of day, location, and/or other factors. For example, within a folder shared among a group of individuals, documents that include social security numbers may only be accessed or synchronized by those individuals who have an appropriate role.

In some embodiments, such a security policy allows the document owner, an end user who has been assigned an 'editor' role and/or the enterprise administrator to modify file security policies. The controls based on the updated policies are then synchronized to the applicable computing devices. For example, the administrator may modify a file to add print permissions, or the administrator may modify a file to remove file access. In some embodiments, a file access is removed by revocation of a file's encryption key by the centralized server 110. In one embodiment, a file previously downloaded remains on the computer, but the file content remains encrypted, and can no longer be accessed.

In some embodiments, an application, such as a synchronization application, software plugin, etc. runs on client devices 122, 124, 132, etc. The application sends out one or more forms of tracking information to the centralized server 110 over a secure channel such as SSL or TLS, whenever an action is performed or attempted on a controlled file. For example, the acts of opening a file, editing a file, printing a file, or attempting to perform these actions are logged. In some embodiments, if network access is unavailable, such tracking information will be cached and communicated when a connection is available. In some embodiments, this tracking information is collected by the centralized server 110. In one embodiment, the tracking information provides an audit trail about interactions with a file distributed from the centralized server 110. In one embodiment, the types, frequency, and specific forms of tracking information may be specified on a per-file basis. In some embodiments, an audit trail may be displayed graphically to a file owner, an enterprise administrator, or other users who have been granted permission to view tracking data as an overlay over a geographical map. In one embodiment, additional information, such as, current controls associated with the file, a versioning history of the file, etc. may also be requested and displayed to a file owner.

Figure 7:
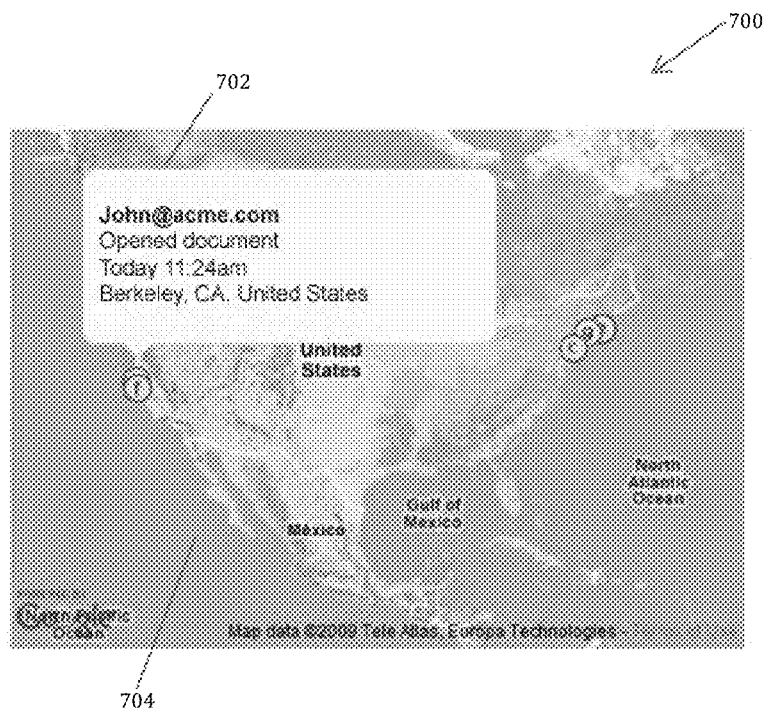
FIG. 7 illustrates an exemplary graphical user interface with audit trail information rendered over a map.

FIG. 7 illustrates an exemplary graphical user interface 700 with audit trail information 702 rendered over a map 704. As illustrated in FIG. 7, the audit trail 702 may provide information such as what action was performed/attempted, where the action was performed, by whom, what time, etc. Other graphical user interfaces, tabular displays, or other communication of this data, may be provided, and tracking information displayed with the graphical user interfaces in accordance with the embodiments discussed herein. In one embodiment, an administrator may search the audit trail, filter it by certain actions (e.g. show only printing of the file), filter it to certain individuals or groups, export it to a file such as an Excel™ sheet or connect it to a logging system such as Security Information and Event Management (SIEM), etc.

In some embodiments, a file uploaded to the centralized server 110 may alternatively be encrypted on the client side (e.g., by an encryption application run on a client computing system) using a unique or substantially unique document key, and assigned controls such as restricting users' ability to access, copy, print or forward it.

In some embodiments, a synchronization application run on the other connected computing devices can connect to centralized server and check for new file versions of the file. As noted above, new versions include changes to the file contents or changes to relevant metadata. If a new version is detected, the synchronization application of a computer system downloads the file over a secure SSL or TLS connection, or other encrypted channels. As determined by the centralized server 110 in accordance with the file's associated security policy, the file may be encrypted and applied controls, it may be stored in unprotected format, or may be presented as a link or a shortcut to a protected online file, for cases where security policy indicates that the file is only available online. In one embodiment, the prior version of the file is deleted. In another embodiment, the prior version is stored on the centralized server or on the client devices so it could be later retrieved.

In some embodiments, the method of synchronizing data from a synchronization application to one or more associated synchronization applications may further include the centralized server 110 identifying a change in meta-data, such as file deletion, rename, permission change, annotations or other meta-data changes. If such an update is detected by the centralized server 110, a synchronization engine of the centralized server 110 will initiate the process of uploading the information to the centralized server if necessary. Such upload will be performed over a secure SSL or TLS connection, or other encrypted channels. Client devices 122, 124, 132, etc. will be notified of the change and will synchronize to acquire the new version of the file according to common industry methods. In some embodiments, if the update includes a security policy change, a receiving device will only update the controls associated with a file. In some embodiments, the update may cause a receiving device to re-download or locally protect the file if necessary. For example, a security policy update may now dictate that a file previously stored in a non-protected format is to be encrypted and protected. In some embodiments, a file policy change may be performed by the document owner, a user with an 'editor' role, or the administrator remotely or directly on the centralized server.

In some embodiments, a security policy may be set to enable the download and caching of document encryption keys by a computing device, such as computing devices 122, 124, 132, etc., for a pre-determined amount of time. The computing device would need to connect back to the centralized server 110 before that time has elapsed for renew this lease. For example, an end user may access a certain file while offline for up to 72 hours, but if the centralized server 110 was not successfully queried for security policy updates by the time the 72 hours have elapsed, file access will be revoked until such an update is retrieved.

In some embodiments, only the delta, or differences between the previous file version and the current file version, will be transferred by the centralized server to computer systems. Since the file may be protected and encrypted, standard algorithms such as Rsync cannot be used as-is. In one embodiment, centralized server 110 and computer systems, such as systems 122, 124, 132, etc., calculate certain checksums to be used for efficient binary level transfer. This is discussed in greater detail below with reference to FIG. 6.

In some embodiments, the centralized server 110 may apply certain transformations to files uploaded to it. In some embodiments, the transformations generate versions optimized for rendering on different device types (e.g. PC, Mac, Web browser, Android, iPhone, BlackBerry). Such transformation may utilize common industry file conversion methods, such as running various Office suites, PDF conversion tools, or the application of virtual desktop infrastructure (VDI). The resulting file versions may be encrypted and associated with security policies. When synchronizing a file to a specific device, the appropriate device-optimized version will be served from the server. For example, a Power- Point document synchronized from a Windows PC may be downloaded to a BLACKBERRY™ by RIM™ in a different format than the original file, so it could be rendered correctly on the BLACKBERRY™. In one embodiment, conversion of documents into different formats for different devices may be performed as described in co-pending U.S. patent application Ser. No. 13/474,089, entitled "Document Distribution System and Method," filed May 17, 2012.

In some embodiments, centralized server 110 may further receive updates to a file from a format other than the original. Centralized server 110 receives the update in the non-original first file version (i.e., a device-optimized version), converts the update to reflect the change in an original version of the file, and propagates the update to the other device-optimized versions if needed. Thus, all versions of the file are updated and made ready for propagation to various computing devices, such as devices 122, 124, 132, etc., regardless of which version was updated by a client computing device.

In one embodiment, device optimization happens on the fly, when a request is received from a device. In one embodiment, device optimization is performed ahead of time based on the devices associated with the designated recipients.

In some embodiments, file content update conflicts may be detected. Such a conflict is resolved using industry standard methods, such as renaming the older version of the conflicted file to indicate the conflict, and/or by keeping a versioning history that can be queried by the user via a web or local client interface.

In some embodiments, centralized server 110 enables a user to exclusively 'check out' certain files, in which case only that user's updates to a file content or meta-data will apply. In some embodiments, conflicting versions and/or changes to a file will be disposed of by the centralized server 110.

In some embodiments, certain meta-data such as annotations made to a file are synchronized alongside that file. In one embodiment, such annotations may be merged back into other file versions, allowing the annotated file to be displayed in a web interface, in Adobe PDF, Microsoft Office, or other applications. For example, a synchronization application run on a client mobile computing device may capture the positions of such annotations made within a file, and when synchronized to the centralized server 110, the centralized server 110 transforms them during file conversion into standard PDF or Microsoft Office™ annotations to be displayed when the document is accessed on a device which can display such annotations. In one embodiment, if the device/application is not capable of displaying such an annotated file, the annotations are maintained separately and synchronized alongside the file.

In some embodiments, application of file controls may be applied locally by a synchronization application run on a client computing device, such as client computing device 122, 124, 132, etc., as soon as a file or files are placed in a pre-designated folder. As an example, a clear text Word document placed into such a folder will immediately be encrypted and protected in accordance with a security policy. In some embodiments, the security policy applied to the document is a default policy, or a specific policy associated with the folder into which the document was placed.

In some embodiments, a different set of controls is applied should the file be copied out of the pre-designated folder, or alternatively the user is prevented from moving the file out from the folder. Furthermore, different sets of controls may be applied to different users, different devices, different device types, etc. As an example, an Excel™ spreadsheet copied (using standard file system commands) and pasted (using standard file system commands) out of the designated folder would create a new version of the document. In one embodiment, such copying would result in the restrictions being higher on that version of the document (e.g. removing ability to print, forward, or having a one day expiration).

In some embodiments, a protected file being accessed by a user at a computer system, such as one of systems 122, 124, 132, etc., will be opened locally in its corresponding native application, such as Microsoft Word™ Excel™, PowerPoint™ or Adobe PDF™, utilizing a rights management module plug-in that enforces controls based on the security policy for the file within the file's native application. The plug-in communicates with the centralized server to retrieve the controls and file encryption key—unless they have already been retrieved and cached—and then uses common industry rights management methods to apply controls based on said policy to the file as it is viewed or edited. This rights management module plug-in may be part of a synchronization application run on a computing device, or may be installed separately. The rights management module plug-in then re-encrypts a file when it is saved. In some embodiments, if the rights management module plug-in is not present on the device at the time a user attempts to access a protected file, the file will be formatted to show a message within its native application with instructions how to obtain the plug-in. The formatting may include display of a message incorporated as part of a clear text portion of the file.

In some embodiments, icon overlays may be placed on the files in a computing device's file system by a synchronization application run on the computing device. The overlays may indicate synchronization status (downloading, synchronized, etc.) as well as a file's associated permission status (only available online, expired, invalid access attempt alert, etc.). In some embodiments, a right-click menu or similar mechanism available to the administrator of the file provides quick access to file tracking information and for performing certain tasks, such as revoking permissions to file, adding users to it, etc.

In some embodiments, the centralized server may further index the synchronized files prior to encrypting them, allowing users to search against the encrypted content, including but not limited to keywords within a document name, keywords within document content, document type, or metatags associated with document. In some embodiments, returned results will only return documents accessible to the particular user on the particular device, at that time and in that geographic location. That is, a policy associated with a document influences whether or not a user, device, location, etc. can receive a file as a search result. Search results may return the complete encrypted document. Alternatively, search results may also return a clip or portion of content surrounding the search terms.

Figure 2:
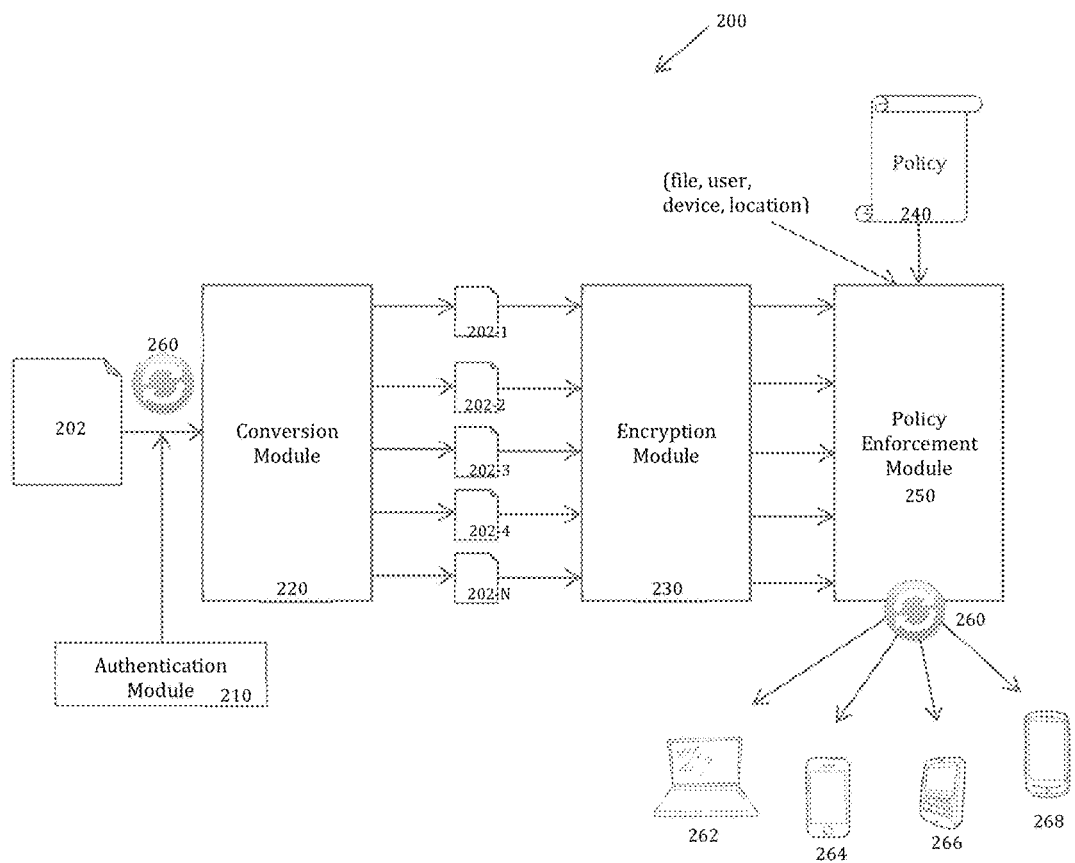
FIG. 2 is a block diagram of one embodiment of a centralized server providing secure synchronization of a file.

FIG. 2 is a block diagram of one embodiment of a centralized server 200 providing secure synchronization of a file. In one embodiment, the centralized server provides a synchronization application via the illustrated modules and engines.

In one embodiment, a file 202 is received at the centralized server 200. In some embodiments, before file 202 may be received by a synchronization engine 260, a user is authenticated on his or her computing device, using standard authentication techniques, to the server 200 by authentication module 210, or to an external identity provider (not shown) communicating with the server 200. Upon authentication module 210 receiving and verifying user credentials, synchronization engine 260 performs the upload and file synchronization, and then forwards resulting file to conversion module 220. File conversion module 220, in one embodiment, automatically converts file 202 to various device optimized file versions 202-1 through 202-N. For example, conversion module 220 may automatically convert a Microsoft™ WORD document into a PDF for display on a non-PC tablet computing device, a Flash animation for display in a web browser, a sequence of image files for a device that cannot display PDFs, and/or other file types optimized for different types of user computing devices.

In one embodiment, each of the converted files is optionally encrypted by encryption module 230. The encryption applied to each file may be any of the standard encryption methods. A security policy 240 is then associated with the uploaded file by policy enforcement module 250. Synchronization engine 260 then makes the files accessible and distributes file and metadata changes to various user computing devices 262-268 upon request or automatically. Furthermore, when files 262-268 are encrypted, in one embodiment, policy enforcement module 250 further distributes file encryption keys via the synchronization engine 260 for the files.

In one embodiment, policy 240 may be set for the file 202 by its administrator, associated with a folder in which file 202 is placed on a client computing device, specified by a user on a per file, per folder, or per system basis, specified by an enterprise or system administrator, etc. In one embodiment, policy 240 specifies what controls are applied to a file and how they are enforced. For example, a policy may specify who may download a file, who may view a file, what devices may receive a file, etc. A policy may further specify what actions may be performed on a file, such as whether the file may be edited, printed, forwarded, etc., and by whom.

Policy enforcement module 250 informs synchronization engine 260 as to what actions may be performed on a file when distributing file updates, metadata updates to user computing devices 262-268. Controls based on the policy 240 and the file, user, device, location, time, and other attributes are then sent along with the file, so that the policy is enforced on the user devices 262, 264, 266, and 268. In various embodiments, the security policy or controls are embedded in the file, part of the metadata associated with the file, in a separate encrypted file associated with the file, or in some other format. If opened on a different device or by a different user, system will first re-synchronize the controls that may vary.

In one embodiment, policy enforcement module 250 may receive updates to policy 240 or other metadata. In one embodiment, when an update to the policy 240 is received, policy enforcement module 250 causes synchronization engine 260 to distribute the updated controls to files maintained on devices 262-268. Furthermore, when a policy results in the revocation of access to a file, policy enforcement module 250 deletes the file, or changes encryption keys associated with the file to render the encrypted content useless.

In one embodiment, conversion module 220 further receives changes to a file 202, from synchronization engine 260. Conversion module 220 distributes the changes to each of the different versions of the files maintained by centralized server. Synchronization engine 260 may then obtain controls from policy enforcement module 250 and distribute the updates to the various user computing devices.

Figure 3:
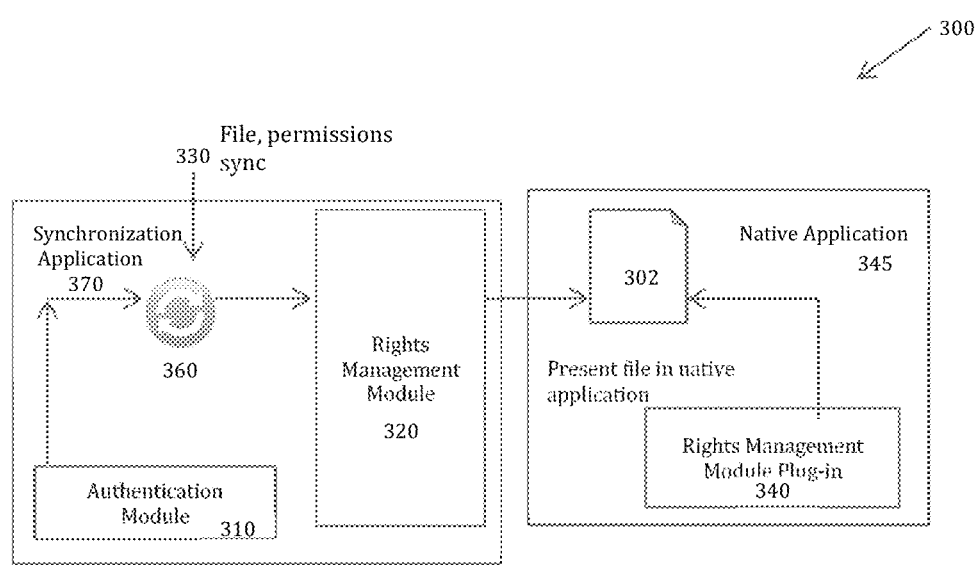
FIG. 3 is a block diagram of one embodiment of a user computer system providing secure synchronization for a file.

FIG. 3 is a block diagram of one embodiment of a user computing system 300 providing secure use and synchronization for a file. In one embodiment, the authentication module 310, synchronization engine 360, and rights management module 320 are components of a synchronization application 370 on a client computing system.

In one embodiment, authentication module 310 receives user credentials that are used to identify and authenticate a user to a synchronization server. Once the user is authenticated, synchronization engine 360 receives various data 330 from the synchronization server, such as decryption keys, file content, file updates, etc. In one embodiment, a file received by synchronization engine includes metadata associated with the file specifying one or more controls associated with the file.

Optionally, rights management module 320 utilizes the controls to ensure that the file 302 is available with the appropriate policy limitations. The file is available in a native application (i.e., a Word document displayed in MSWord™, etc.), if that native application 345 has the rights management module plug-in 340, to enforce the policy. If no such plug-in 340 is available, the data is not accessible via that application, in one embodiment. If the application which would display the file in the native format is not available, the system may provide the file in a different format.

In one embodiment, synchronization engine 360 checks for updates to file 302 at synchronization server. One embodiment of a process for locating and downloading updated portion of files is described below in FIG. 6. The updates are then distributed to file 302 and any policies associated with the file are managed by rights management module 320.

Figure 4:
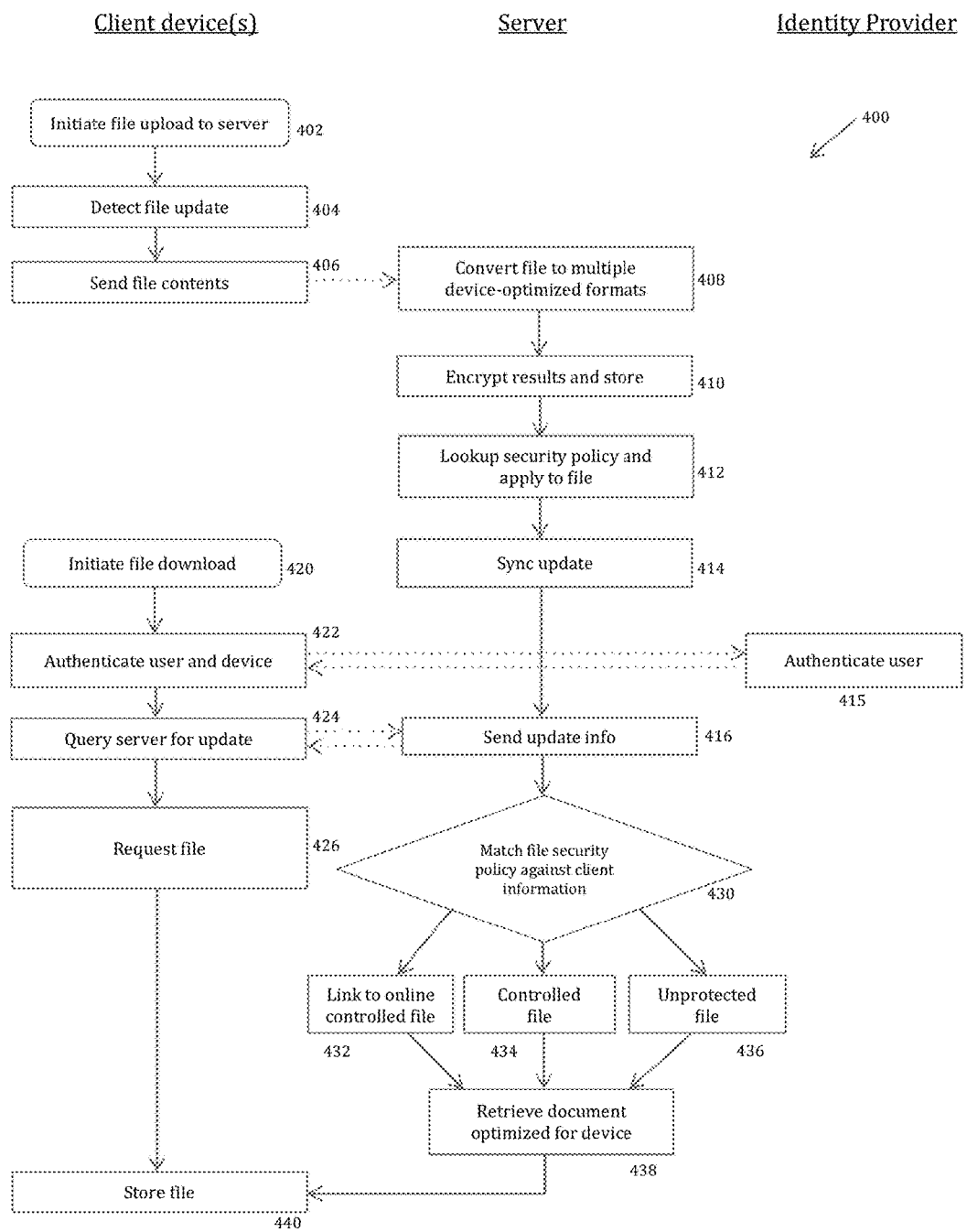
FIG. 4 illustrates one embodiment of a process for updating file content with a client computing device and a centralized server.

FIG. 4 illustrates one embodiment of a process 400 for updating file content with a client computing device and a centralized server. The process is performed by processing logic that may comprise hardware (circuitry, dedicated logic, etc.), software (such as is run on a general purpose computer system or a dedicated machine), or a combination of both. In one embodiment, the process is performed by synchronization applications run on a client computer system and a centralized server.

The process starts at block 402 when a client initiates a file upload to a centralized server. A file update is detected, such as a file being created, a file being dropped in a specific folder on a client computing device's file system, a file's contents being updated, etc. (block 404). The file contents are then transferred by the client to a centralized server over a computer network (block 406).

The centralized server converts the received file contents or updates to multiple device-optimized formats (block 408). In one embodiment, the formats utilized for conversion are associated with a policy of an uploaded document. In another embodiment, the formats utilized for conversion are pre-selected by the centralized server based on to which devices and/or display types a document may be distributed to (e.g., Flash or HTML5 for web-based applications/devices, Word™ for PC computing devices, PDF for Apple™ devices, etc.). The converted documents are then encrypted and stored (block 410). In some embodiments, the file conversions are performed on demand, transforming files as they are requested by the client computing devices.

The server performs a policy lookup and applies the located policy to the file and/or contents as metadata (block 412). The policy lookup determines the policy assigned to the file by the originator of the file or by the administrator. The policy may range from making the file available in clear text to everyone, to allowing only online access to the file, with no copying, printing, or editing. In one embodiment, the policy is based on specifications of a user associated with the file, an enterprise administrator, or default options.

The file contents are then synchronized to the server (block 414). When client initiates a download of file content and/or updates (block 420), the user provides authentication credentials for the user and/or device (block 422). After the user is authenticated (block 415) by an identity provider, which may be part of the centralized server or an independent provider, the client queries the centralized server for an update (block 424) and the server responds with update information (block 416). One embodiment for determining what data should be updated is described below in FIG. 6. When client determines that there is data for a file that is to be updated, client requests the file and/or updates from the server (block 426).

In one embodiment, server utilizes the user and/or device credentials received at block 415 from an identity provider, which may be a part of the centralized server or a separate system (not shown) that would communicate the established identity back to the centralized server, to match one or more security policies associated with a file against client information (block 430). That is, the server determines based on the file policy and on user and device credentials, whether a user and device is able to receive, view, perform actions, etc. on a file. Based on the determined user and device, a spectrum of different permission levels may be associated with a file. For example, a determined low level of access may cause server to embed a security policy within a file that provides a link to view a document online only (block 432), a determined intermediate level of access may cause server to associate a security policy with a file that provides several controls for the file, such as copy, transfer, viewing, etc. controls (block 434), and a determined high level of access may cause server to embed a security policy that enables unprotected access to a file (block 436). Server serves the document format optimized for the device (block 438), and with the determined controls associated with the document, and transfers the document to the client.

The client then synchronizes the file and stores it (block 440) as commonly done in industry, and may access and perform actions on the file according to the controls associated with the file.

Figure 5:
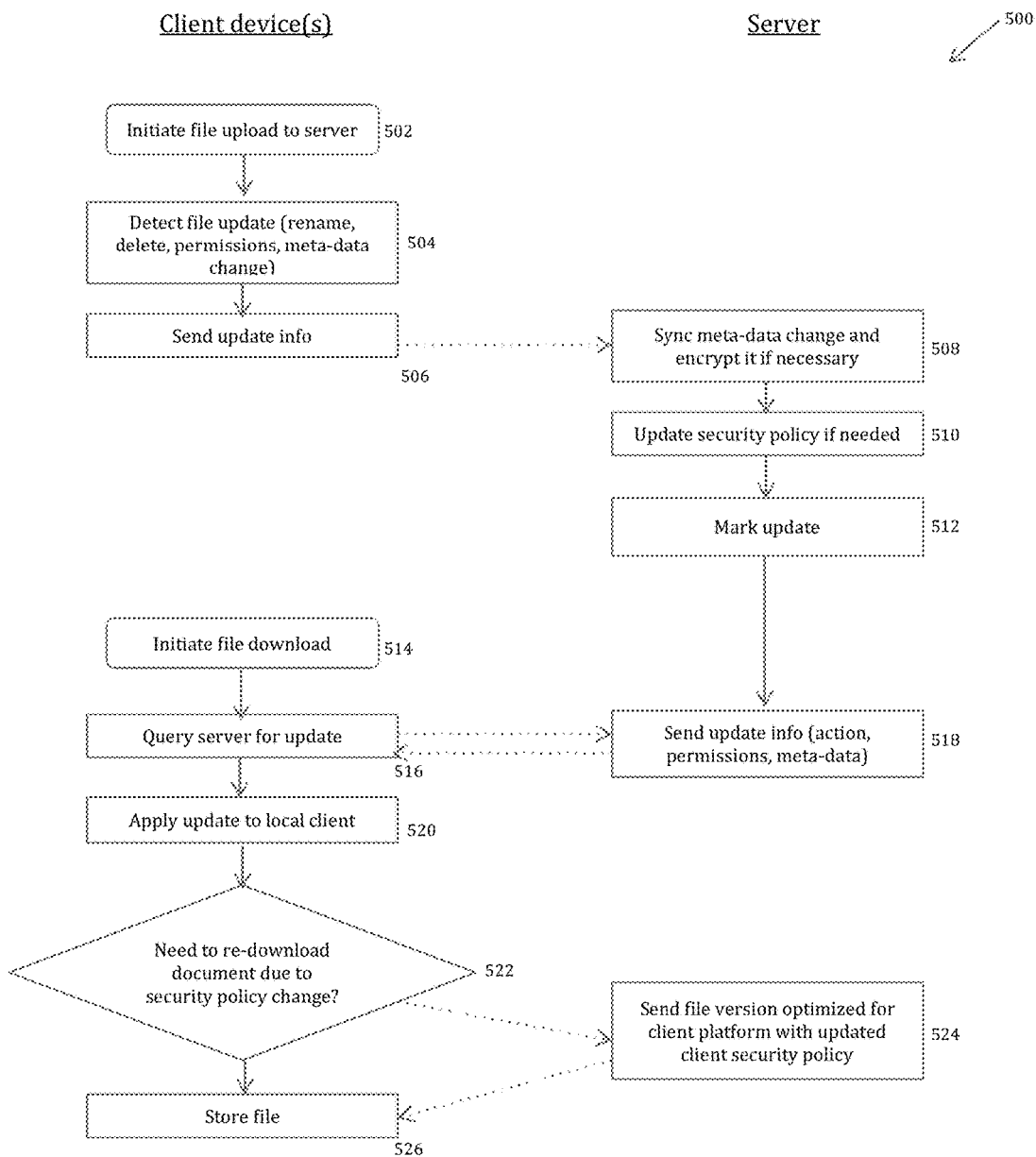
FIG. 5 illustrates one embodiment of a process for updating file metadata with a client computing device and a centralized server.

FIG. 5 illustrates one embodiment of a process 500 for updating file metadata with a client computing device and a centralized server. The process is performed by processing logic that may comprise hardware (circuitry, dedicated logic, etc.), software (such as is run on a general purpose computer system or a dedicated machine), or a combination of both. In one embodiment, the process is performed by synchronization applications run on a client computer system and a centralized server.

The process starts at block 502 when a client initiates a file upload to a centralized server. The client detects a change in metadata for a file (block 504). For example, a file may be renamed, deleted, security policy changed (e.g., permissions, actions, authorizations, etc. changed, added, or rescinded), or other metadata changed. The update to the file is then sent to the centralized server (block 506).

The centralized server receives the update and synchronizes the metadata change(s), if necessary (block 508). For example, a change to metadata may be distributed to several pre-created and device-optimized versions of a file. Based on the changes to the metadata, server may further update security policies associated with the files (block 510). Server marks the update for later synchronization with a corresponding file on a client computer system (block 512).

Client initiates a file download with the server (block 514). Although not illustrated, client may need to provide authentication credential with the server in order to receive updates. Client queries server for an update (block 516) and server responds with updated metadata, such as updated action permissions, metadata, security policies, etc., if any (block 518).

The client applies the update to the local version of the file (block 520) as commonly done in industry. One embodiment of updating a file is described below in FIG. 6. In one embodiment, an update may require client to re-download a document due to a security policy change (block 522) or alternatively the client may apply controls locally. For example, a decryption key change, access right changes, security policy changes, etc. could require a new document to be downloaded by the client from the server. Server provides an optimized version for a client platform with the updated security policy (block 524). Client then stores the updates to the file, or the new file (block 526). The process then ends.

Figure 6:
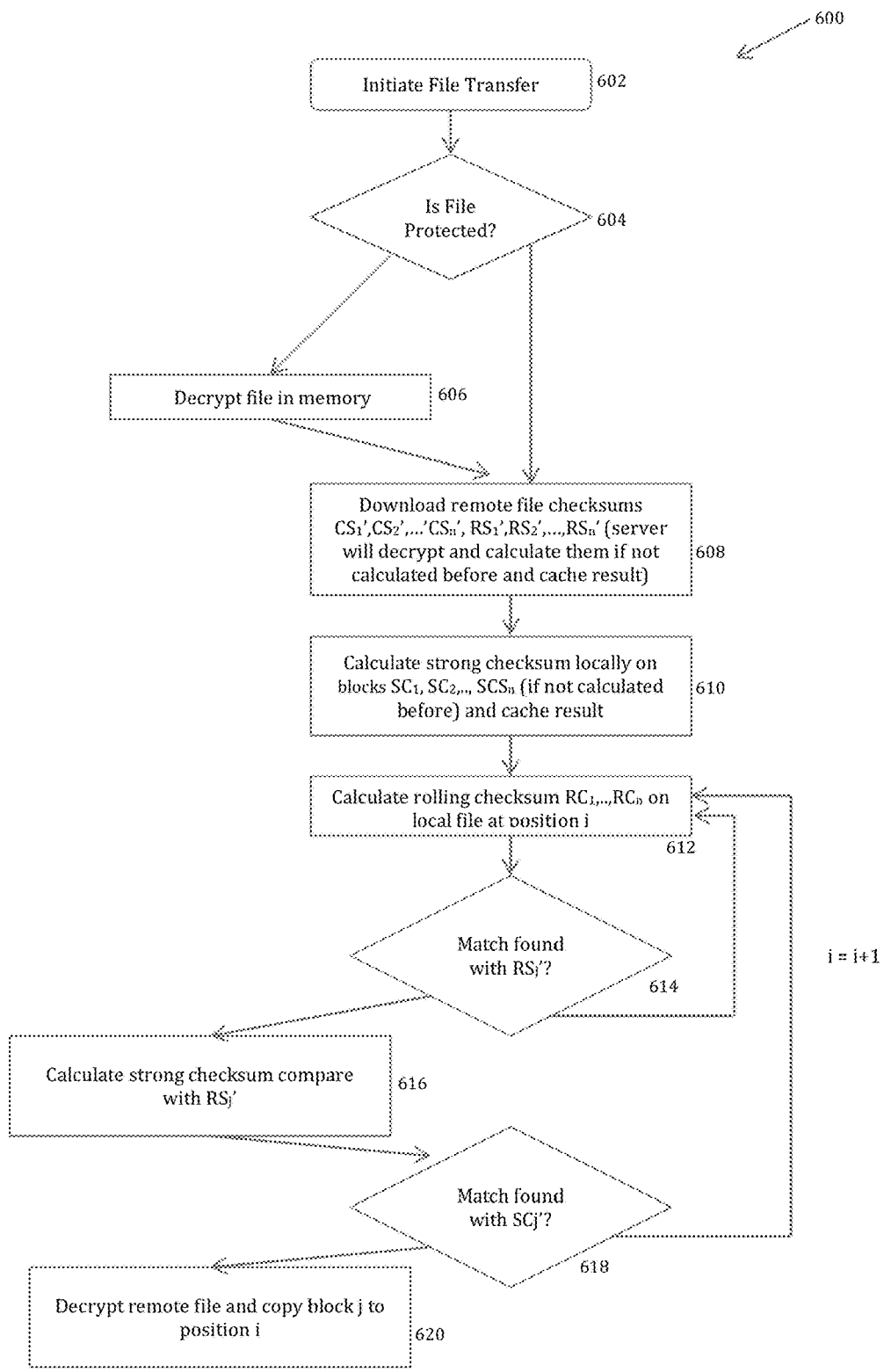
FIG. 6 illustrates one embodiment of a process for synchronizing portions of an updated file.

FIG. 6 illustrates one embodiment of a process 600 for synchronizing portions of an updated file. The process is performed by processing logic that may comprise hardware (circuitry, dedicated logic, etc.), software (such as is run on a general purpose computer system or a dedicated machine), or a combination of both. In one embodiment, the process is performed by synchronization applications run on a client computer system. In some embodiments, only the delta, or differences between the previous file version and the current file version, will be transferred for synchronizing file contents. Since the file may be protected, standard algorithms such as Rsync cannot be used as-is. The process illustrated in FIG. 6 is a modification of Rsync method, but which is suited to the secure synchronization of files as discussed herein.

The process starts at block 602, for example, when a client initiates a file transfer with a centralized server (block 602). The client determines whether the file is protected (block 604). If the file is protected, the file is first decrypted in the memory of the client computing system (block 606).

In one embodiment, two sets of file checksums for fixed-sized non-overlapping blocks are downloaded from the centralized server (block 608). In one embodiment, the downloaded checksums are pre-calculated by the centralized server after it initially decrypted the file. In another embodiment, the checksums are calculated lazily whenever a file is requested and then cached by the centralized server.

Client, in one embodiment, also calculates two sets of checksums: checksums based on a strong hash such as MD5 or SHA1, and checksums based on a weaker rolling checksum, of file contents (block 610 and 612). The two checksums calculated by the client and server are for fixed-length non-overlapping chunks of data within a file.

A rolling checksum is used to match chunks against the checksums on the centralized server (block 614). If a match is found for a chunk, the stronger checksum is compared as well (block 616). Upon a successful match (block 618), the corresponding file chunk is taken from the previous version of the file and does not need to be re-uploaded, thus conserving time and bandwidth. However, if no match is found (block 618), the non-matching contents of the file is received by the centralized server from the computer system (block 620). In some encryption modes, in one embodiment the system will re-encrypt the subsequent chunks of the file to adjust for a different pseudo-random sequence that would result from using algorithms such as cipher-block chaining (CBC) mode encryption. In one embodiment, a similar system is used for synchronizing, by downloading selective file chunks that have been changed.

In one embodiment, in order to facilitate synchronizing portions of an updated file, files may be stored by the server and/or client at the block level (i.e., the fixed-length non-overlapping chunks of data) along with corresponding checksums for the blocks. As a result, de-duplication can be performed using a hash table to locate any similar blocks and chain it onto the file. In this embodiment, each block of data is processed as a separate file and metadata is maintained that describes how each of these blocks makes up the original file.

Figure 8:
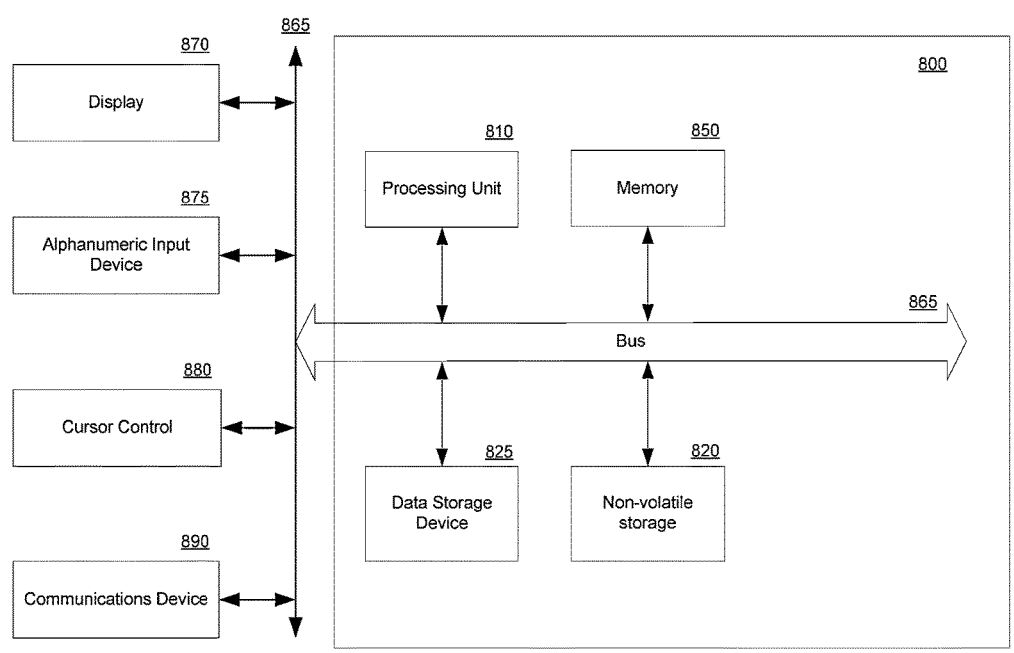
FIG. 8 is a block diagram of one embodiment of a computer system that may be used with the present invention.

FIG. 8 is one embodiment of a computer system on which the present invention may be implemented. It will be apparent to those of ordinary skill in the art, however, that other alternative systems of various system architectures may also be used.

The data processing system illustrated in FIG. 8 includes a bus or other internal communication means 865 for communicating information, and a processor 810 coupled to the bus 865 for processing information. The system further comprises a random access memory (RAM) or other volatile storage device 850 (referred to as memory), coupled to bus 865 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 865 for storing static information and instructions for processor 810, and a data storage device 825 such as a magnetic disk or optical disk and its corresponding disk drive. Data storage device 825 is coupled to bus 865 for storing information and instructions.

The system may further be coupled to a display device 870, such as a cathode ray tube (CRT) or a liquid crystal display (LCD) coupled to bus 865 through bus 865 for displaying information to a computer user. An alphanumeric input device 875, including alphanumeric and other keys, may also be coupled to bus 865 through bus 865 for communicating information and command selections to processor 810. An additional user input device is cursor control device 880, such as a mouse, a trackball, stylus, or cursor direction keys coupled to bus 865 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments of the present invention.

It will be appreciated by those of ordinary skill in the art that any configuration of the system may be used for various purposes according to the particular implementation. The control logic or software implementing the present invention can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The present invention may also be embodied in a handheld or portable device containing a subset of the computer hardware components described above. For example, the handheld device may be configured to contain only the bus 865, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 810, a data storage device 825, a bus 865, and memory 850, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 810. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, etc.

In the description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "providing", "generating", "propagating", "distributing", "transmitting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer implemented method comprising:
detecting, at a server computing device, a file content update on a first computing device, the file, in a first format, created by a first application and the file to be synchronized on a plurality of different computing devices in a plurality of different formats optimized for rendering on different device types, the plurality of different computing devices including a second computing device receiving the file in a second format optimized for the second computing device;
associating, at the server computing device, a security policy with the file, wherein security controls are to be applied to the file based on the security policy, and wherein the security controls comprise one or more of viewing restrictions, copying restrictions, printing restrictions, forwarding restrictions, access restrictions, application of watermarks, setting of expiration dates and times, authentication requirements, redaction, and prevention of screen captures;
responsive to determining at the second computing device that one or more of the security controls to be applied to the file are unenforceable by a second application of the second computing device when the security controls are applied to the file in the second format:
transforming, at the server computing device, the file to a different format of the plurality of different formats, wherein the security controls, when applied to the file in the different format, are enforceable by the second application of the second computing device; and
applying, at the server computing device, the security controls to the file in the different format for enforcement, by the second application at the second computing device, of the applied security controls with respect to the file in the different format; and
propagating, at the server computing device, the file content update to the file in the different format comprising transforming the update to a corresponding update for the file in the different format.

2. The method of claim 1, further comprising:
transforming the file into the plurality of different formats; and
propagating the file content update to each of the plurality of different formats of the file, comprising transforming the update to corresponding updates for each of the plurality of different formats of the file.

3. The method of claim 1, further comprising:
receiving an update to metadata of the file from one of the plurality of different computing devices, wherein the metadata update is an annotation associated with a location within the file, and the annotation metadata is propagated to annotations at corresponding locations within each of the plurality of different formats of the file, and thereafter distributed to each of the plurality of different computing devices.

4. The method of claim 1, further comprising:
detecting an update to metadata of the file from one of the plurality of different computing devices, wherein the updated metadata comprises an update to the security policy;
propagating the metadata update through each of the plurality of different formats of the file; and
distributing the security controls derived from the metadata update to each of the plurality of computing devices comprising determining whether the update to the metadata can be applied to an existing file.

5. The method of claim 4, further comprising causing the second computing device to acquire the file in the different format when the update to the metadata cannot be applied to the file in the second format on the second computing device.

6. The method of claim 1, further comprising:
receiving tracking information from one or more of the plurality of different computing devices, the tracking information including at least data indicative of actions performed or attempted to be performed on the file with respect to the security policy; and
logging the tracking information on a centralized server.

7. The method of claim 1, wherein the security policy associated with the file causes the application of a plurality of different levels of control, wherein each of the different levels of control provides a different level of access for actions that can be performed on the file.

8. The method of claim 1, wherein the format of the file is transformed to one or more of:
a clear text, unprotected file;
an encrypted file with controls associated with it, restricting one or more of: who is permitted to access the file, where, on what device, at what time, and what operation a user is permitted to perform on the file; and
a link or shortcut to a controlled online version of the file.

9. The method of claim 1, further comprising:
controlling use of the file synchronized on a computing device, as determined by the security policy associated with the file, and by one or more of the following parameters: an identity of a user of the computing device, a type of the computing device, network connection type and availability, time of day, a geographic location of the computing device, file content, file classification or metadata, level of authentication used, and file location in file system.

10. The method of claim 9, wherein controlling use comprises requiring re-acquisition of the security controls applied to the file, thereby enabling updates to the security policy associated with the file to be automatically enforced at the computing device.

11. The method of claim 1, further comprising:
providing a folder, wherein a file, when placed into the folder, is automatically synchronized.

12. The method of claim 11, wherein when the file is placed into the folder, one or more security controls based on the security policy are automatically applied to the file.

13. The method of claim 11, wherein when the file is removed from the folder, the security policy adjusts the restrictions associated with the file.

14. The method of claim 11, wherein placement of the file in the folder does not permit removal of the file from the folder.

15. The method of claim 1, further comprising:
displaying an indication of file status as an overlay over a file icon or a notification message to an end user or both, wherein the file status indicates one or more of: a file protection status, a file offline availability status, a file expiration status, a file synchronization status, and a display indicative of controls that have been applied to the file.

16. The method of claim 1, further comprising:
enabling an end user to select a local file to retrieve additional information on the file or perform one or more operations that include: view an audit trail of the file, view current controls associated with the file, view versioning history of the file, modify file controls, and revoke file access.

17. The method of claim 1, further comprising:
generating a searchable index of contents and metadata associated with the file prior to encrypting the file and the metadata, wherein the index enables search queries to be performed on file contents by end users, and wherein search queries return results that an end user is authorized to receive based on the security policy associated with the file.

18. The method of claim 1, wherein the file is encrypted and wherein detecting a file content update on the first computing device further comprises:
decrypting the file upon receipt;
calculating two types of checksums for fixed-length non-overlapping blocks within the decrypted file: a rolling checksum and a cryptographic hash;
caching the checksums;
comparing the calculated rolling checksums against rolling checksums calculated by a server computing system from a current version of the file maintained by the server computing system;
upon obtaining a match of rolling checksums for a block, comparing cryptographic hashes calculated for the block;
when a match is found for a cryptographic hash of a fixed-length non-overlapping block of data in the file, using a corresponding fixed-length non-overlapping block of data block of data from the current version of the file on the server computing system, in lieu of transferring it from the first computing system over a network; and
when a match is not found for the cryptographic hash of the fixed-length non-overlapping block of data in the file, transferring the fixed-length non-overlapping block of data as an updated data block of the file to the server computing system.

19. The method of claim 18, wherein the file is stored in blocks corresponding to the non-overlapping chunks of data along with checksums for the blocks.

20. The method of claim 1, wherein files to be synchronized reside in one or more disparate storage systems selected from a network drive, a network attached storage (NAS), a storage area network (SAN), a content management system, and a cloud service.

21. A secure synchronization system comprising:
a memory to store a file; and
a hardware processor coupled with the memory, and configured:
to detect, at a server computing device, a file content update on a first computing device, the file, in a first format, created by a first application and the file to be synchronized on a plurality of different computing devices in a plurality of different formats optimized for rendering on different device types, the plurality of different computing devices including a second computing device receiving the file in a second format optimized for the second computing device;
to associate, at the server computing device, a security policy with the file, wherein security controls are to be applied to the file based on the security policy, and wherein the security controls comprise one or more of viewing restrictions, copying restrictions, printing restrictions, forwarding restrictions, access restrictions, application of watermarks, setting of expiration dates and times, authentication requirements, redaction, and prevention of screen captures;
responsive to determining at the second computing device that one or more of the security controls to be applied to the file are unenforceable by a second application of the second computing device when the security controls are applied to the file in the second format:
to transform, at the server computing device, the file to a different format of the plurality of different formats, wherein the security controls, when applied to the file in the different format, are enforceable by the second application of the second computing device; and
to apply, at the server computing device, the security controls to the file in the different format for enforcement, by the second application at the second computing device, of the applied security controls with respect to the file in the different format; and
to propagate, at the server computing device, the file content update to the file in the different format comprising transforming the update to a corresponding update for the file in the different format.

22. The system of claim 21, further comprising the processor configured:
to transform the file into the plurality of different formats; and
to propagate the file content update to each of the plurality of different formats of the file, comprising transforming the update to corresponding updates for each of the plurality of different formats of the file.

23. The system of claim 21, further comprising the processor configured:
to detect an update to metadata of the file from one of the plurality of different computing devices, wherein the updated metadata comprises an update to the security policy;
to propagate the metadata update through each of the plurality of different formats of the file; and
to distribute the security controls derived from the metadata update to each of the plurality of computing devices comprising determining whether the update to the metadata can be applied to an existing file.

24. The system of claim 23, further comprising the processor configured to cause the second computing device to acquire the file in the different format when the update to the metadata cannot be applied to the file in the second format on the second computing device.

25. The system of claim 21, further comprising the processor configured to receive tracking information from one or more of the plurality of different computing devices, the tracking information including at least data indicative of actions performed or attempted to be performed on the file with respect to the security policy, and logging the tracking information on a centralized server.

26. The system of claim 21, wherein the security policy associated with the file causes the application of a plurality of different levels of control, wherein each of the different levels of control provides a different level of access for actions that can be performed on the file.

27. The system of claim 21, wherein the format of the file is transformed to one or more of:
a clear text, unprotected file;
an encrypted file with controls associated with it, restricting one or more of: who is permitted to access the file, where, on what device, at what time, and what operation a user is permitted to perform on the file; and
a link or shortcut to a controlled online version of the file.

28. The system of claim 21, further comprising the processor configured to control use of the file synchronized on a computing device, as determined by the security policy associated with the file, and by one or more of the following parameters: an identity of a user of the computing device, a type of the computing device, network connection type and availability, time of day, a geographic location of the computing device, file content, file classification or metadata, level of authentication used, and file location in file system.

29. The system of claim 21, further comprising a folder for automatic synchronization, wherein the processor is configured, when a file is placed into the folder, to automatically synchronize the file to a centralized server.

* * * * *